(12) United States Patent
Ojeda Monge

(10) Patent No.: US 12,253,213 B2
(45) Date of Patent: Mar. 18, 2025

(54) HIGH-PRESSURE GAS STORAGE SYSTEM HAVING ADAPTABLE MORPHOLOGY

(71) Applicant: GO AHEAD ENGINEERING SL, El Puerto de Santa Maria (ES)

(72) Inventor: Antonio Ojeda Monge, El Puerto de Santa Maria (ES)

( * ) Notice: Subject to any disclaimer, the term of this patent is extended or adjusted under 35 U.S.C. 154(b) by 257 days.

(21) Appl. No.: 17/629,812

(22) PCT Filed: Jul. 11, 2020

(86) PCT No.: PCT/ES2020/070453
§ 371 (c)(1),
(2) Date: Jan. 25, 2022

(87) PCT Pub. No.: WO2021/023899
PCT Pub. Date: Feb. 11, 2021

(65) Prior Publication Data
US 2022/0260207 A1     Aug. 18, 2022

(30) Foreign Application Priority Data
Aug. 6, 2019   (ES) .................................. 201931345

(51) Int. Cl.
*F17C 1/06*     (2006.01)
*F17C 1/16*     (2006.01)

(52) U.S. Cl.
CPC ................. *F17C 1/06* (2013.01); *F17C 1/16* (2013.01); *F17C 2201/0109* (2013.01);
(Continued)

(58) Field of Classification Search
CPC ...... F17C 1/06; F17C 1/16; F17C 2201/0109; F17C 2203/0604; F17C 2203/0607;
(Continued)

(56) References Cited

U.S. PATENT DOCUMENTS 6,206,027 B1 *   3/2001   Ponnet ...................... F17C 1/00
                                                                         137/256
6,418,962 B1 *   7/2002   Wozniak ................... F17C 1/02
                                                                         220/586
(Continued)

FOREIGN PATENT DOCUMENTS

CA      2990267 A1 *   7/2018   ............. B29C 70/16
DE      102017220715 A1 *   5/2019
DE      102020123303 A1 *   3/2022

*Primary Examiner* — Nathan J Jenness
*Assistant Examiner* — Madison L Poos
(74) *Attorney, Agent, or Firm* — Eugenio J. Torres-Oyola; Victor M. Rodriguez-Reyes; Rafael Rodriguez-Muriel

(57) ABSTRACT

The invention relates to a device basically consisting of the packaging of matrices of parallel tubes that act as pressurised containers. Both ends of each tube are hermetically connected to collectors located in the vicinity of the ends of the tubes. The collectors have multiple accommodations distributed according to the packing pattern of the tube matrix, there being an accommodation for each tube end. At least one collector has an internal channel that allows the connection of fluids between the tubes forming the tube matrix. This collector has an opening that allows fluid exchange between the inside of the tubes and the outside. The assembly comprising the tube matrix and collectors is surrounded by a structural belt. The collectors have a rounded geometry in the area of contact with the belt. Reinforcement fibres of the belt are mainly arranged parallel to the axis of the tubes. Reinforcement fibres of the tubes are mainly arranged in the circumferential direction of same. Those areas of the assembly comprising the tube matrix and collectors not covered by the belt are covered by casings. A rigid foam occupies the spaces between the outside of the tubes and the rest of the space inside the belts and the casings.

13 Claims, 8 Drawing Sheets

(52) U.S. Cl.
CPC ......... *F17C 2203/0604* (2013.01); *F17C 2203/0607* (2013.01); *F17C 2203/066* (2013.01); *F17C 2203/0673* (2013.01); *F17C 2221/012* (2013.01); *F17C 2223/0123* (2013.01); *F17C 2223/036* (2013.01); *F17C 2270/0171* (2013.01)

(58) Field of Classification Search
CPC ........ F17C 2203/066; F17C 2203/0673; F17C 2223/0123; F17C 2223/036
USPC ............... 220/23.2, 581, 586, 591, 592
See application file for complete search history.

(56) References Cited

U.S. PATENT DOCUMENTS

| | | | |
|---|---|---|---|
| 10,465,848 B1* | 11/2019 | Newhouse | F17C 1/04 |
| 2017/0343162 A1* | 11/2017 | Yersak | F17C 13/083 |

* cited by examiner

HIGH-PRESSURE GAS STORAGE SYSTEM HAVING ADAPTABLE MORPHOLOGY

FIELD OF THE INVENTION

The invention relates to a high-pressure storage system for gas such as hydrogen with application to the transport sector.

The invention refers to a novel system formed by an array of storage elements containing the gas, and structural elements arranged in order to support the pressure loads. These elements have a particular geometry and setup which allows to dispose the system in an adaptable way. This setup helps to accommodate the system within the geometry of the available room in the vehicle.

The elements of the system are made of composite materials with the purpose of bearing the high pressure loads of the hydrogen and allowing to reduce weight, making the transport more efficient.

STATE OF THE ART

The conventional systems used for the storage of pressurized gas are based on bottle or cylinder shaped vessels. These vessels are characterized by having an elongated cylindrical body with a hemispherical or domed shape at the ends. One of the ends has an opening that allows to introduce or extract gas. This geometry allows to significantly minimize the wall thickness of the tank needed to withstand the pressure loads exerted by the gas contained inside. The weight of the vessels is thereby reduced.

For stationary applications where the tanks do not move, they are usually made of metallic materials, such as steel. In the applications in which the tank is installed in a mobile vehicle, the weight of the tank penalizes the overall weight of the vehicle. In this application, composite materials based on carbon fiber reinforcements or other fibers of the same type are used to achieve sufficient strength to withstand the pressure loads and decreasing weight compared to the ones made of metallic materials. The cylindrical shape of these tanks may be a disadvantage when being integrated into the interior of the vehicles, such as the fuel storage compartment of a car, or inside the wings of an aircraft, where the fuels of the aircraft are generally stored. In these cases, the occupied space must be optimized and the geometry of the container in the form of a long cylinder makes difficult to accommodate it inside the structure of the vehicle in a rational manner, in terms of using the inner space of the vehicle. In addition, in the case of hydrogen, due to its physical properties, the bottle shaped tanks occupies a bulky volume due to the high pressure at which this gas is stored, complicating its integration, for example, inside the structure of a conventional car.

The current trend in terms of the use of the electric motor on cars and transport, makes the gaseous hydrogen as a candidate suitable to be the fuel thereof since it does not produce greenhouse gas carbon dioxide. The hydrogen is conveyed from the tank to a fuel cell in order to produce electricity and feeding the electric motor, so moving the vehicle. Preferably hydrogen should be stored in tanks whose incorporation into the available space of the vehicle is not impacted by a bulky tank. This is the case of current bottles which constrains the structural or aerodynamic shape of the vehicle, as well as the geometry of the cabin thereof.

Regarding the manufacture of the bottle-shaped or cylinder-shaped tanks in composite material, a special technique called filament winding is normally used which consists of winding the fiber or reinforcement around a mandrel with the shape of the tank. The directions of the fibers are strategically placed to reinforce the wall of the tank against the axial and circumferential loads produced by the pressure of the gas. The task of winding the mandrel is particularly complex mostly when placing fibers on the domed portion of the ends of the bottle or cylinder. This method is particular on each vessel, so involves higher production times as compared to the manufacture of a carbon fiber tube by an extrusion or pultrusion, in which the manufacture is continuous and the placement of the reinforcement is simpler.

Other manufacturing systems uses tubular braided fabrics which can be expanded in diameter and adapted to the geometry of the mandrel especially when diameter changes on domed zones at the ends. The disadvantage of fabric-based reinforcements is that they have lower strength than non-woven unidirectional fiber reinforcements. Therefore, the wall thicknesses of these tanks using tubular braided fabrics are bigger and heavier.

The patent WO196023721A1 refers to a system where several bottle shaped tanks with a special deformation that allows them to be coupled, by a series of structural and functional elements, to work in parallel as a single tank. The overall geometry and shape of the system allows to integrate it in the vehicle in an efficient manner in terms of using the space available for such purpose. The latter purpose is achieved with the present invention

SUMMARY OF THE INVENTION

The present invention solves the problem related to the storage of a pressurized gas such as hydrogen in conventional bottle-shaped tanks of bulky geometries that makes difficult to install those inside a vehicle.

On the other hand, the excessive weight of the tank is a problem when it is used in the transport industry, since it involves a larger energy needs for a displacement. With the present invention, it is possible to significantly decrease the weight of the tank by using composite materials on the manufacturing process, where the fiber reinforcements are oriented in a simple and efficient way to withstand the loads produced by the pressure of the gas inside the structure of the system.

In addition, in the manufacturing process of the vessels made with composite material with traditional bottle-shaped geometry where the filament winding technology is used, this involves a slow and complex process. With the present invention, that process is not necessary. The manufacture of the main components of the system can be performed using continuous manufacturing and less complex processes.

Moreover, the use of reinforcements in the form of fabrics is not necessary with the present invention, this being an advantage due to the fact that composite materials with woven reinforcement have mechanical properties with lower ultimate strength than those that have nonwoven reinforcement fibers and they are disposed in a unidirectional way.

The resins used in the manufacturing of composite vessels are usually those of the thermosetting type. Experts on the matter know that this implies that once the usable life of the vessel has been completed, it has an expensive and complicated recycling process. On the other hand, these thermosetting resins require a long curing time, which re-impacts in long manufacturing cycles affecting their manufacturing chain process. The elements comprising the storage system of the present invention allow it to be made of thermoplastic composites, which recycling method is simpler and economical. By not requiring the curing phase of the resin, it presents a lower manufacturing time and the production chain process of the storage system is easier. In addition, the thermoplastic composite materials can be welded together, with this bonding process it can be achieved shorter manufacturing times than those that uses thermosetting resins, where the bonding is made with the use of an adhesive, thereby involving the associated time-consuming task of the surface preparation of the bonding surfaces.

So, the present invention is characterized by presenting a series of straight tubes forming an array where the inside of each tube serves as a container storing the gas. The tubes are oriented parallel to each other, contained between collectors located one on each side of the ends of the tubes. The collector have manifold accommodations to receive and connect the ends of the tubes of the storage system. The end of the tubes is hermetically attached to the collector's accommodations. The accommodations are strategically distributed to take advantage of the available space in that face of the collector which is exposed to insert the ends of the tubes.

At least one of the collectors contains in its interior an internal conduit made of several channels that allows fluidic connection between the whole arrays of tubes of the storage system. The latter collector has a hole in a lateral side which connects to the internal conduit and it allows to fill and empty fluids inside the storage system. A structural element in the form of a belt wraps the assembly formed by the tubes and the collectors, where this belt is made by winding a reinforcing tape around the assembly. The tape has a straight shape parallel to the axial direction of the tubes along the length of the tubes of the assembly. The collectors have a curved surface on its face exposed to the belt. The belt is smoothly wrapped to this surface of the collector avoiding uneven curves in the changes of directions when passing from the straight section over the tubes to the curved section over the collector.

In the case of the existence of areas in the assembly that are not covered by the structural belt, they are closed with covers having a geometry which allows to close these zones. These covers have flanges which overlap with the structure of the belt and the collectors, serving as a bonding surface to the rest of the elements of the system. In this way, the tubes array is contained between the collectors, the belt and the covers. A rigid foam is introduced into the system comprising the outside of the tubes, essentially, those gaps between the tubes and limited to the interior volume defined by the space between the collectors, the belt and the covers.

The volume and shape of the storage system of the present invention can be adapted to be fitted where it is intended to be located. The storage system is configured by the lengths of the tubes, its cross section, packing arrangement and connection between the collectors and the shape of the collectors where the belt is wrapped. The total volume intended for gas storage is comprised by the inner volume of the tubes arrays and the volume existing inside the collectors and the inner conduits to communicate the fluid.

Thus, an example of adaptation of this storage system could be the one where the volume available for the storage vessel is presented in the form of a rectangular prism. Using the storage system presented in this invention, two collectors are placed on two opposite sides of the prism, respectively. The tubes are placed in parallel between the two collectors with the axial axis of each tube perpendicular to the face of the collector where the ends of the tubes are coupled. By decreasing the cross section of the tubes, enables to place a greater amount of tubes within the system, enhancing the packing factor within the volume of the rectangular prism.

In this way, it is achieved a greater volume of the pressurized gas inside the storage system of the present invention. The choice of the appropriate cross section of the tube will depend on the requirements of the particular application.

The present invention is characterized by the orientation of the reinforcing fibers of the tubes which are aligned mostly in the direction of the circumferential force experienced on the wall of the tube due to the pressure of the gas. Thus, the strength capability of the reinforcement is optimized to match the pressure experienced on the wall of the tube inside according the structural configuration of the present invention, and therefore, a minimized wall thickness is achieved. Other fibers orientations other than that explained before, are avoided in order to decrease the weight of the system, although its use can be implemented in case there is the need to provide more cohesion to the tube walls.

On the other hand, by decreasing the cross section of the tube, the circumferential force exerted on the walls of the tube decreases considerably for a given pressure inside a vessel, so the tube wall thickness is reduced and therefore, the weight of the storage system. Thus, the cross section of the tubes can be studied for each case in detail, having a compromise between the application allowable weight requirement and the target usable volume, taking into account as well the system complexity for its manufacturing, for example, in the case of using micrometric diameter tubes which could be challenging.

The sealing of the tube inserted in the collector can be accomplished by various methods, such as welding when the elements to be joined allow such bonding technology, by the use of an adhesive, by mechanical adjustment, by the use of gaskets or a combination of all of the aforementioned methods. The structure of the system is designed to prevent this connection to present load stresses due to the longitudinal forces experienced on a pressurized cylinder.

Thus, the pressure exerted by the gas in the open end side of each tube is transmitted to the body of the collector acting as a manifold plug, transmitting the pressure load to the belt. In this way the belt experiences two equal loads forces but opposite direction so they are compensated, corresponding those forces to those of the two collectors located at both ends of the tubes, where both, tube array and collectors, are wrapped by the belt. These loads would come from the pressure exerted by the gas in the open side of the tubes into the collectors, and from the collectors to the belt.

The latter feature is the strategy key of the present invention which allows to relief the pressure loads experienced at the connection between the tube and the collector due to the pressure of the gas and its corresponding axial load. Thus, this axial load is borne by the structural belt, rather than the joint between the tube and the collector. The belt is designed and manufactured to support this load by means of unidirectional composite material having the orientation of the reinforcement aligned with the axial axis of the tubes and thus with the direction of the load, thereby an optimized efficiency is achieved in terms of the strength capability of the reinforcement. Thus, the use of the material is reduced, and therefore, the weight associated therewith as well.

The curved shape of the belt in the zones where it fits over the curved portion of the collectors allows to transfer the pressure loads of the gas exerted on the collectors into the belt in a suitable manner without producing stress concentrations in such structural elements.

The inner surface of the storage system of the present invention generally exhibits a coating liner that decreases the permeability of the gas contained inside, especially for the case of gaseous hydrogen, therefore decreasing the permeation of gas through the intermolecular interstices of the materials used in the container walls of the storage system.

The experts in the matter can appreciate that the manufacture of the tubes used in this storage system can be carried out by various manufacturing methods using composite materials, such as those known in the art as pultrusion, straight mandrel winding, molding with pre impregnated materials, resin transfer molding, injection, infusion, among other methods. Amongst them, the most remarkable are those manufacturing processes which achieve the manufacture of the tubular geometry in a continuous and unlimited way, such as pultrusion or continuous compression molding.

In the same line, the structural component of the belt has several methodologies for its manufacture, from manual layup, to an automated machine by rotating the storage system assembly to be taped along its wrapping axis and being wrapped by the tape coming from a tape dispensing roll to form the belt. Both, the rotation of the taping assembly and the tape dispensing roll can be automated for mass manufacturing. Some forces in the belt during taping can be introduced to improve the bonding of the reinforcement layers to each other and create a preload on the belt. The connection between the belt and the wrapped assembly can be accomplished by welding or making use of adhesive as manufacturing processes.

The rigid foam introduced between the outer interstices of the tube array and between the collectors, the belt and the covers, this serves as thermal insulation to prevent abrupt changes in temperature in the gas contained by the storage system. It also works as a structural element, damping possible vibrations and/or impact loads. In addition, in case of failure or rupture of any of the tubes, the foam provides a damping effect on the fragments which can be projected by the explosive action of the gas contained in the interior of the system.

The closure covers serve to provide protection to the array of tubes against possible impacts. Covers are installed strategically in order to close any gap in the assembly where the tubes can be exposed to the external events depending on the storage system configuration adopted in each case. These are attached to the assembly by using a series of flanges which overlap with the rest of the components of the assembly by adhesive, welding, or mechanical fastening methods.

In the event of a failure of any of the tubes, both, the belt and the panels serve as a damping element for fragments which can be projected by the explosive action of the gas contained inside.

The gas storage system can be manufactured in composite materials, making use as reinforcement synthetic fibers, such as carbon, aramid, glass, or of natural origin, such as flax or hemp. In this sense, fibers based in metal or ceramic origin are also considered. Thermoplastic or thermosetting resins are considered for the resin matrix. Also, resins of natural origin. Metallic, and ceramic materials may be considered for any of the components or elements described above which conforms the gas storage system of the present invention.

The burst strength of the tubes, due to pressure exerted by the gas, is designed to be less than the ultimate strength of the structural belt, so the first element to failure will be the tubes, then, foam, belt and the panels of the storage system will be used as shock absorbing elements in the event of failure of any tube of the storage system.

In the case of hydrogen as contained gas in the storage system of the present invention, the nominal pressure is 85 MPa, and the failure pressure is 155 MPa. The materials and the arrangement of the storage system are configured to meet these requirements in addition to the ones related to the weight of the assembly, usable volume for storing and the geometry available to accommodate the hydrogen storage system.

DETAILED DESCRIPTION OF PREFERRED EMBODIMENTS

Figure 1:
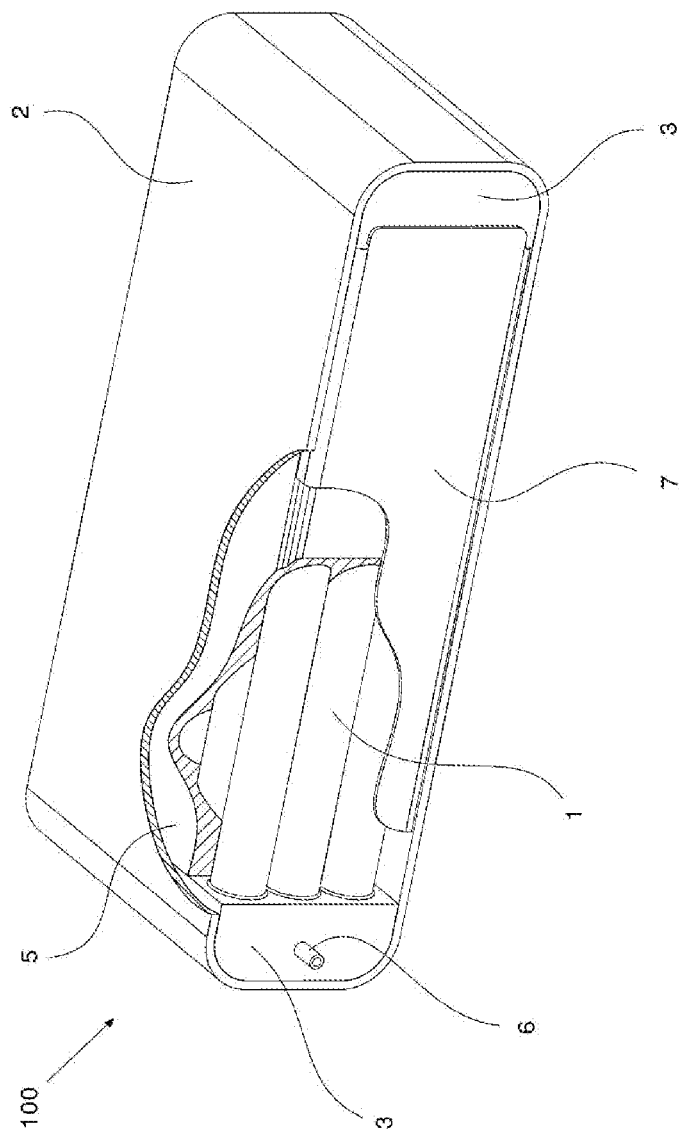
FIG. 1 presents a perspective view of the gas storage system in which several partial cuts are presented, allowing to see all the components that comprises the system according to one embodiment.
Figure 2:
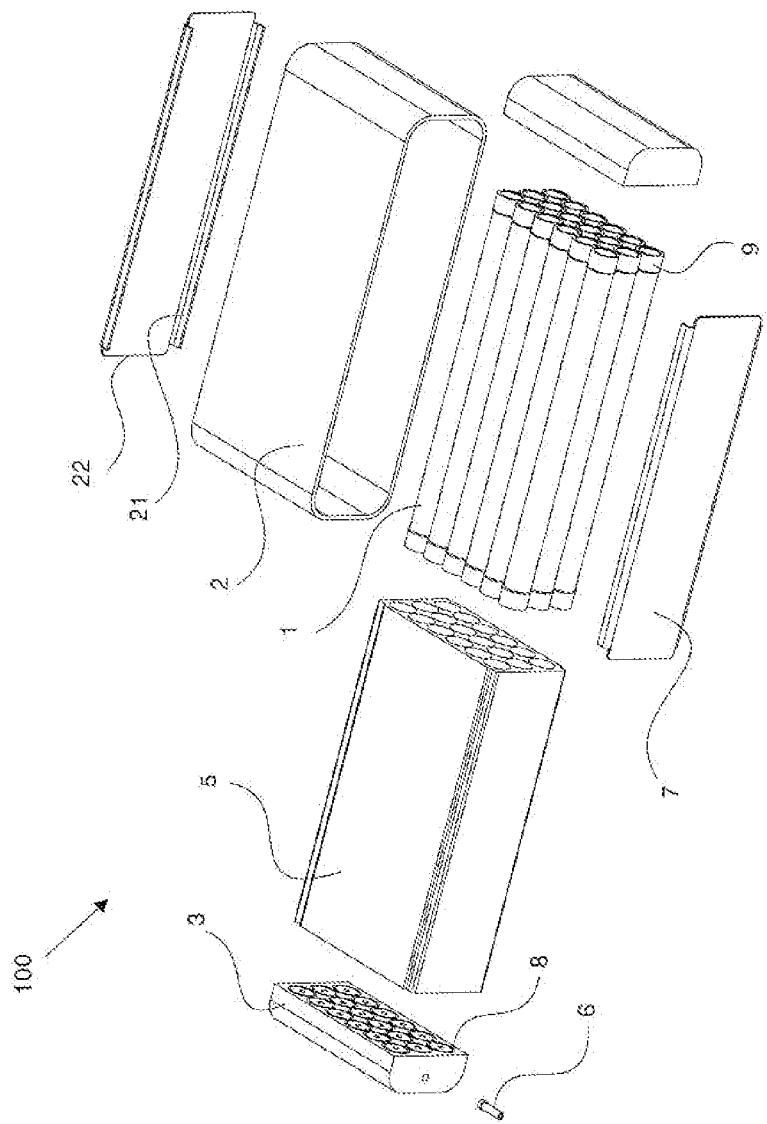
FIG. 2 presents an exploded view of the system of FIG. 1.
Figure 3:
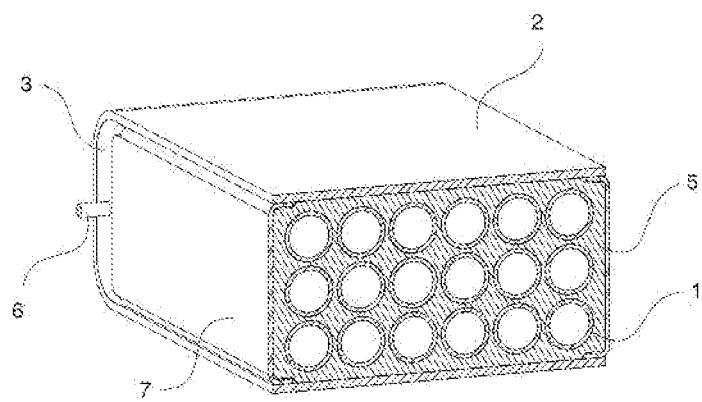
FIG. 3 presents an isometric cross-sectional view of the system of FIG. 1 having a cut along a plane perpendicular to the axis of the tubes.

Focusing on FIGS. 1 to 3 where is presented a system 100 according to one embodiment, in which a plurality of tubes 1 of equal length, where the tubes interiors serve as a gas storage space, is distributed in the form of a matrix or array, the ends of the tubes 1 being plugged by collectors 3. The tubes 1 matrix and collectors 3 are wrapped inside a belt 2. The sides not covered by the belt 2 are closed within a cover 7. The remaining space contained between the collectors 3, the belt 2 and the cover 7, and not occupied by the tubes 1, is filled with a rigid foam 5. One of the collectors 3 presents on one side a hole 13 where a port 6 is located in order to fill and to empty the system 100 with gas. The tubes 1 are inserted into accommodations 8 located at the collectors 3 on the face exposed to the tubes 1. A bonding surface 9 welded, adhesively and/or mechanically joined, ensures the system 100 to be sealed at the connection between the tubes 1 and the collector 3. The covers 7 have flanges 21 and 22 to facilitate attachment with other components of the system 100 by overlapping those flanges. Thus, the covers 7 have folded flanges 21 which overlap on the belt 2, allowing a welded, adhesive and/or mechanical connection between the two components. Likewise, the covers 7 have flanges 22 which overlap with lateral surface of the collector 3 allowing the welded, adhesive and/or mechanical connection between both components.

Figure 4:
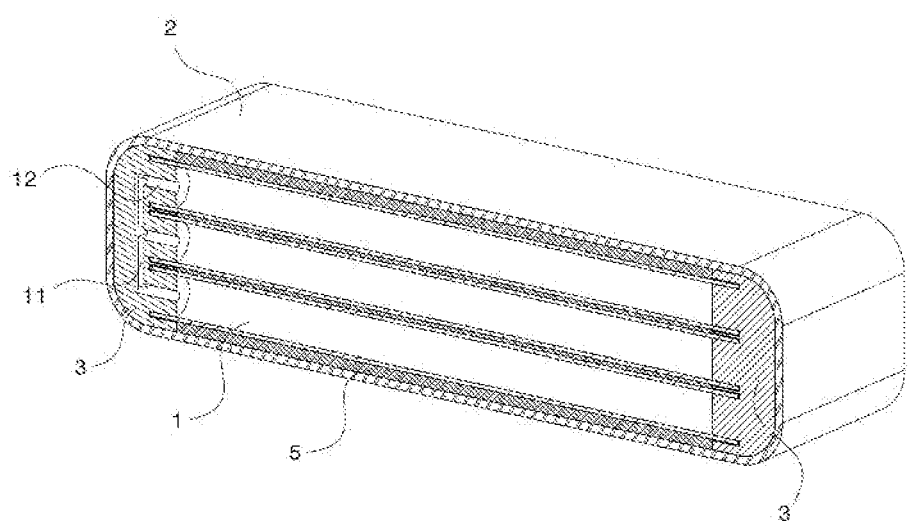
FIG. 4 presents an isometric cross-sectional view of the system of FIG. 1 having a cut along a plane parallel to the axis of the tubes and containing an internal channel of the collector that allows fluidic connection between the sectioned tubes.
Figure 5:
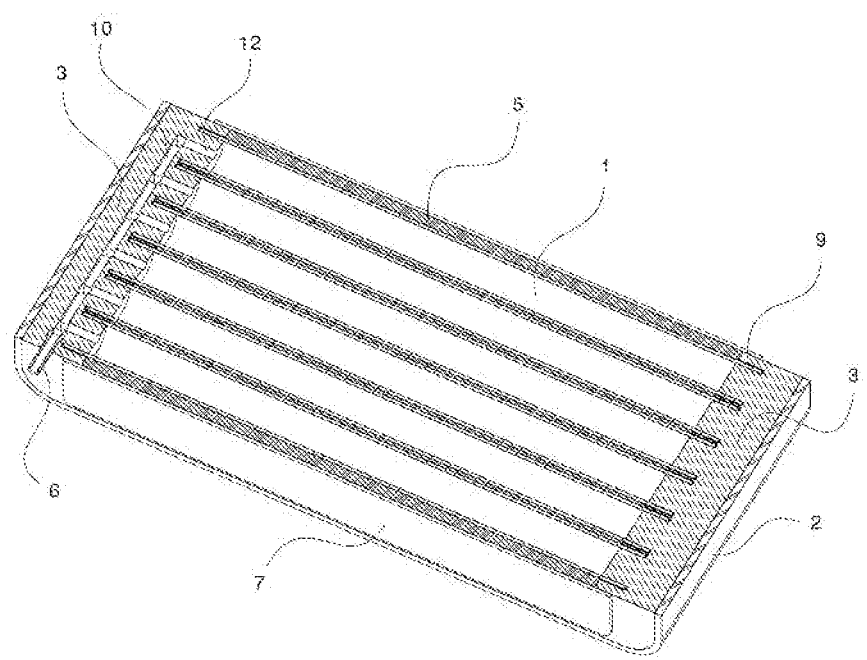
FIG. 5 presents an isometric cross-sectional view of the system of FIG. 1 having a cut along a plane parallel to the axis of the tubes and containing an internal channel of the collector that allows fluidic connection between the sectioned tubes and the outside of the storage system through a port.
Figure 6:
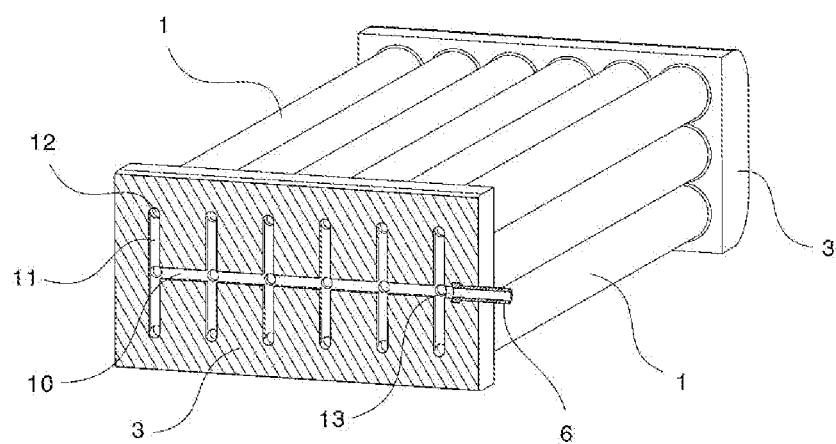
FIG. 6 presents an isometric cross-sectional view of the system of FIG. 1 having a cut along a plane that contains the internal conduit of the collector that allows the fluidic connection between all the tubes of the system, having been omitted the representation of the covers, the foam and belt for clarity.

Attention is paid now on the FIGS. 4 and 6, where is shown a system 100 according to the same embodiment, in which a collector 3 have on its interior a conduit formed by a main channel 10 that branches into secondary channels 11. These channels 11 are connected by holes 12 with the inside of the tubes 1 allowing fluidic connection between the plurality of tubes 1. The main channel 10 connects to a hole 13 enabling entry and egress of gases in the system 100 through the port 6.

Figure 7:
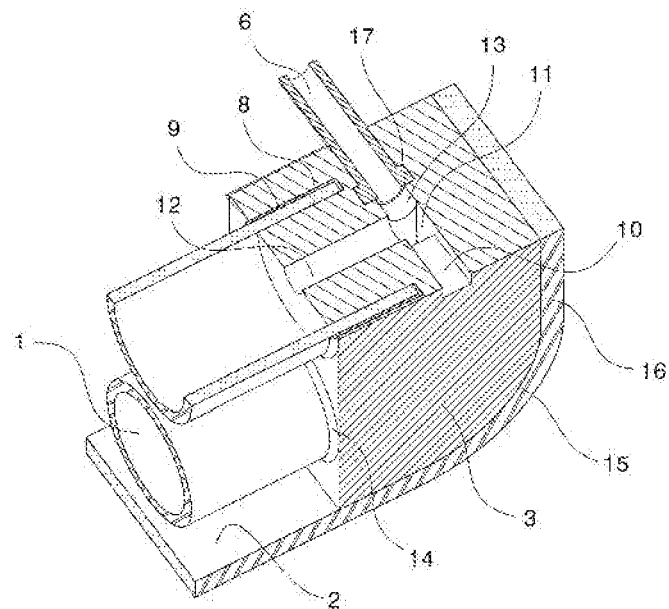
FIG. 7 presents an isometric view of the system of FIG. 1 cross-sectioned by three orthogonal planes allowing to see details of the connections between components of the system.

The system 100 according to the same embodiment is shown in FIG. 7 with a detail showed by a three orthogonal cutting planes sections showing the main components of the system 100: the tubes 1, belt 2 and collector 3 and its integration with each other. In addition, there is also shown a detail of the connection of the collector 3 with the port 6. The tube 1 is attached to the collector 3 by a bonding surface 9 with a thickness of weld material, adhesive and/or mechanical adjustment presenting a seam 14 of the same bonding material between both components being located on the outer contour of the tube 1 and the face of the collector 3 exposed to the tubes 1. The collector 3 is made of composites of reinforcement fiber and thermoplastic polymeric matrix as the same type as the tubes 1 facilitating the welded connection between both components. An accommodation 8 allows a portion of the length of the tube 1 to be inserted into the interior of the collector 3. This accommodation 8 presents a groove forming the geometric shape of the cross section of the tube 1 and with a width similar to the wall thickness of the tube 1 and a depth that allows the tube 1 to be inserted a portion of the length of the tube 1 in the collector 3 sufficient to ensure the structural and hermetic joint between both components. The collector 3 has a curvature 15 in the area of contact with the belt 2, avoiding the adjustment of the belt 2 on a surface with corners. The connection between the belt 2 and the collector 3 is carried out by a bonding surface 16 of weld, adhesive and/or mechanical adjustment. The port 6 is inserted into the hole 13 by welding, adhesive means and/or mechanical adjustment. The port 6 has an anchoring element 17 which fits inside the body of the collector 3.

Figure 14:
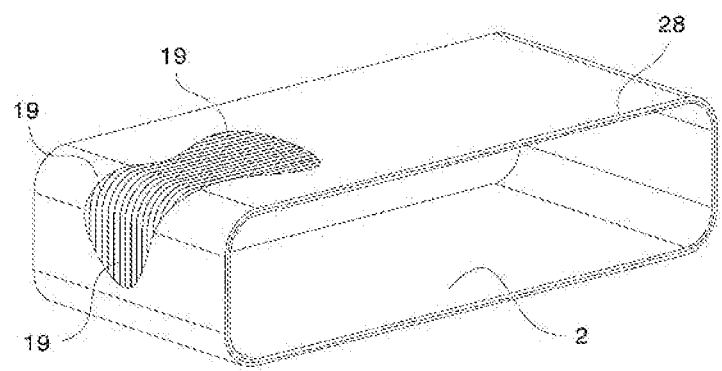
FIG. 14 presents a perspective view of the component called the belt of the gas storage system where a surface cut has been made to clearly present the arrangement of reinforcing fibers that comprises the composite material of which it is made. In addition, an imaginary dashed line is represented on the belt that serves as a reference to clearly indicate the arrangement of the reinforcing fibers of this component.
Figure 15:
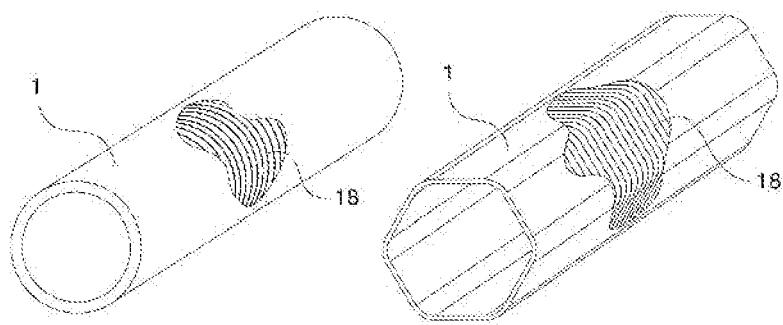
FIG. 15 presents a perspective view of the component called the tube of the gas storage system where a superficial cut has been made to clearly present the arrangement of reinforcing fibers that comprises the composite material of which it is made. Said figure includes two tube geometries according to two possible embodiments. One of them being characterized by the tube represented on the left of the figure, which has a circular cross section, and the other embodiment, by the tube represented on the right of the figure, which has a polygonal cross section, in particular with a regular hex shape.

Focusing the attention in FIGS. 14 and 15 it is shown surface cuts through the belt 2 and the tube 1, allowing to clearly see the reinforcement fibers of both components. Particularly, the reinforcement fibers 19 of the belt 2 are disposed mostly in parallel to the direction of the loop 28 which describes the belt 2 by wrapping it around the assembly formed by the tubes 1 and the collectors 3. The reinforcement fibers 18 of the tubes 1 are disposed in its major part circumferentially to the axial axis of the tube 1, following a path that is wound around the axial axis of the tube 1.

Figure 8:
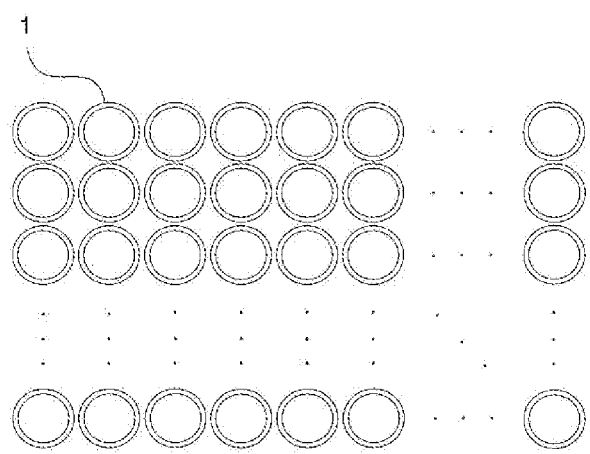
FIG. 8 presents a front view of the tubes of the system of FIG. 1 with a square packing arrangement.

FIG. 8 shows the tubes 1 according to one embodiment of the system 100 characterized by presenting a spatial arrangement of the tube 1 array in which a square packing arrangement is adopted, the axis of each tube 1 being located at each node of a square flat lattice. In this arrangement the tubes 1 are in contact with each other, or, between the tubes 1 there is a certain gap. The tubes 1 in contact have some type of welded and/or adhesive bonding in the contact area.

Figure 9:
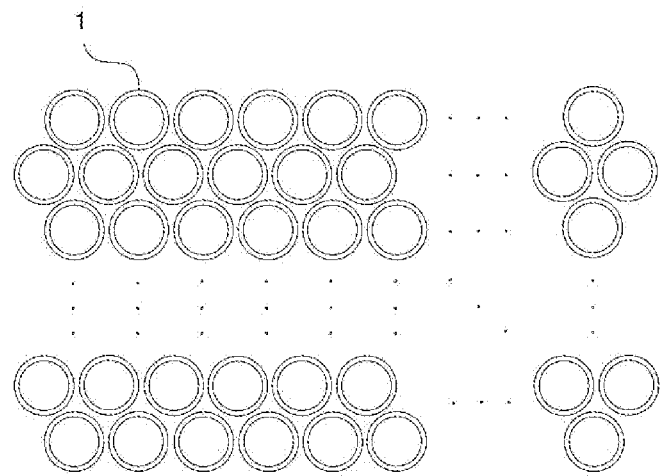
FIG. 9 presents a front view of the tubes of the system of FIG. 1 with a hexagonal packing arrangement.

FIG. 9 shows the tubes 1 according to one embodiment of the system 100 characterized by presenting a spatial arrangement of the tube 1 array in which a hexagonal packing arrangement is adopted, the axis of each tube 1 being located at each node of a triangular flat lattice. In this arrangement the tubes 1 are in contact with each other, or, between the tubes 1 there is a certain gap. The tubes 1 in contact have some type of welded and/or adhesive bonding in the contact area.

Figure 10:
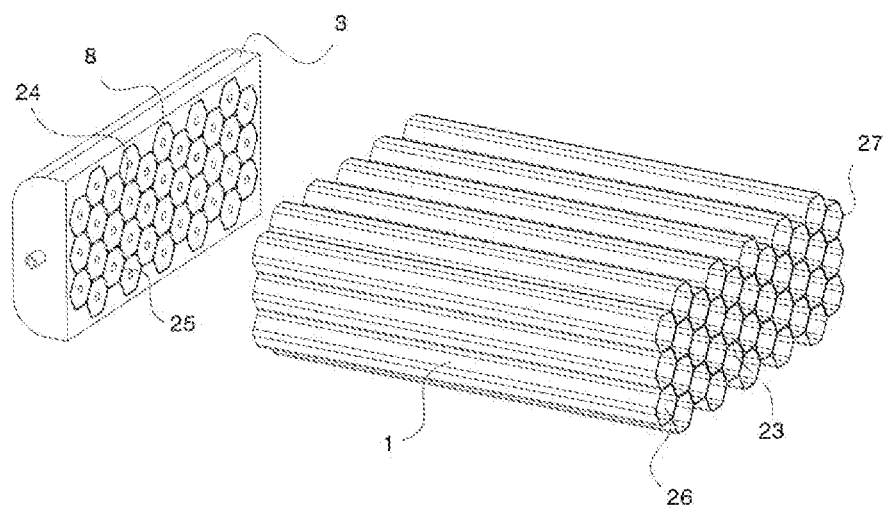
FIG. 10 presents an exploded perspective view of the gas storage system, in which the representation of some components has been omitted to clearly expose the system according to another embodiment.

FIG. 10 shows an embodiment of the system 100 in which the representation of some components has been omitted. In this embodiment the tubes 1 have a hexagonal shape 26 in its cross section, with rounded corners 27. The tubes 1 are arranged together adopting a triangular packing with the side walls 23 of each tube 1 in contact with its consecutive tube, so gaps are decreased outside the tubes. Also, the collector 3 has accommodations 8 for inserting the tubes in a groove pattern 24 whose shape is done according to a similar pattern as the cross section of the array of tubes 1. Additionally, each section 25 of the groove pattern 24 serves to accommodate the walls of one or two tubes 1 in contact.

Figure 11:
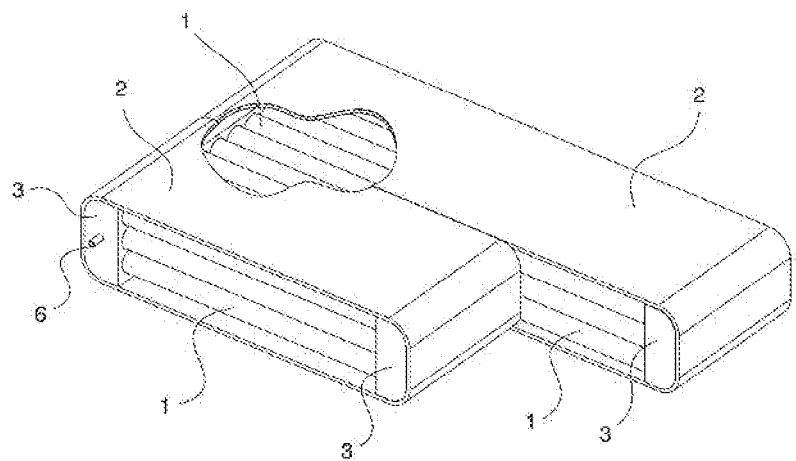
FIG. 11 presents a perspective view of the gas storage system, in which a partial cut is presented and the representation of some components has been omitted to clearly expose the system according to another embodiment.

FIG. 11 shows the main components of the system 100 according to another embodiment in which there are at least two sets of tubes 1 arrays characterized each of those by a different length of tube 1. Each set is integrated by tubes 1 of the same length. This length is different for each set. This embodiment set allows the system 100 to be configured according to different spaces for example to be accommodated in a vehicle avoiding obstacles from the architecture thereof. The sets share a common collector 3 that allows fluidic connection between all tubes 1 of the system 100. The ends of each set of tubes 1 array opposite to the common collector 3 are inserted into accommodations 8 of an independent collector 3 for each set of tubes 1 array. An independent belt 2 for each tube 1 array is wrapped around each set of tubes 1 array, containing the common collector 3, the tubes 1 array and the independent collectors 3 connected to each tubes 1 array.

Figure 12:
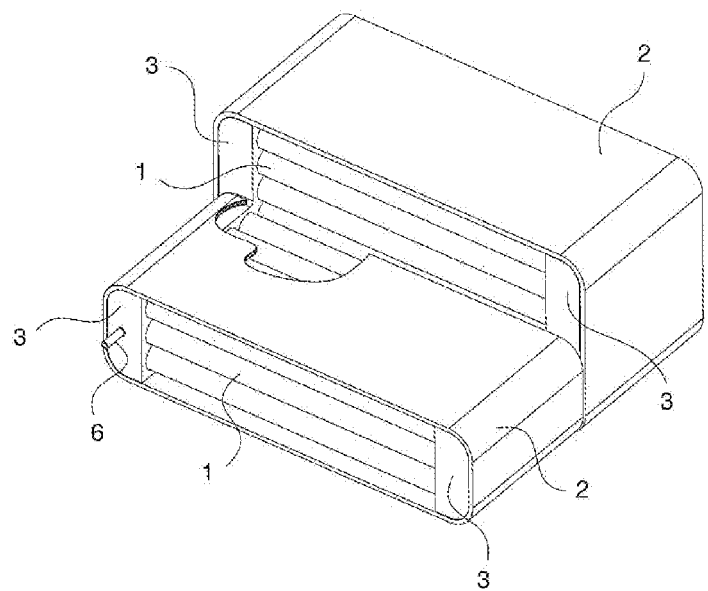
FIG. 12 presents a perspective view of the gas storage system, in which a partial cut is presented and the representation of some components has been omitted to clearly expose the system according to another embodiment.

FIG. 12 shows the main components of system 100 according to another embodiment in which there are at least two sets of tubes 1 arrays characterized each of them by presenting a tube packing with a certain number of rows and columns, different for each set. This embodiment also allows the system 100 to be configured depending on space available to accommodate it inside a vehicle. The tubes 1 arrays share a common collector 3 that allows fluidic connection between all of the tubes 1 of the system 100. The common collector 3 presents a geometry in the face exposed to the tubes 1 adapted to the shape of the tubes 1 arrays being inserted therein. An independent belt 2 is wrapped around each tubes 1 array containing the common collector 3, the array of tubes 1 and the collector 3 opposite to the common collector 3.

Figure 13:
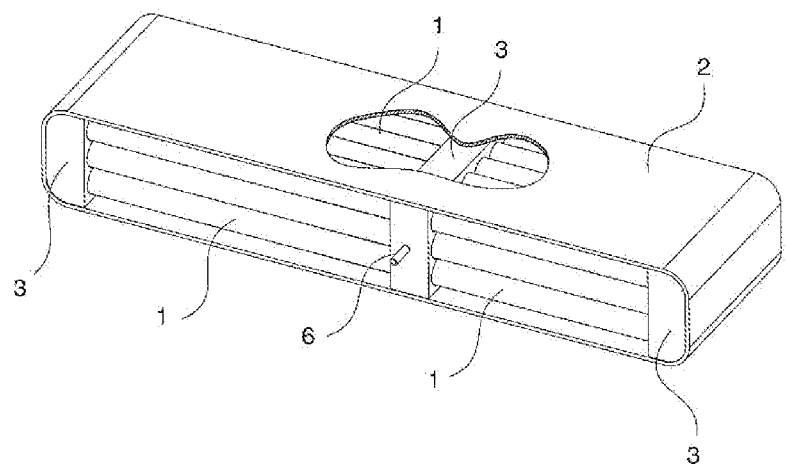
FIG. 13 presents a perspective view of the gas storage system, in which a partial cut is presented and the representation of some components has been omitted to clearly expose the system according to another embodiment.

FIG. 13 shows the main components of the system 100 according to another embodiment in which there is a collector 3 located between two tubes 1 arrays. This middle collector 3 can be located between more than two tubes 1 arrays. The length of the tube 1 of each tubes 1 array may be different. This collector 3 allows fluidic connection between all the tubes 1 of the system 100 presenting inside conduits of the same type to those discussed above. It also presents accommodations 8 where the tubes 1 are inserted on both faces exposed to the tubes 1. The port 6 can be inserted into this middle collector 3 situated between tubes. This embodiment allows the gas be filled and emptied from the system 100 at an intermediate location, different from the ends of the volume span as in the case of the above disclosed embodiments. Locating the gas inlet/outlet in an intermediate place of the total volume of the gas storage system 100 may be advantageous when integrating the system 100 inside a vehicle. The free ends of the tube arrays 1 are connected to collectors 3 and this assembly is wrapped with a belt 2.

The invention claimed is:

1. A pressurized gas storage system, comprising:
a plurality of tubes distributed in a matrix arrangement, wherein the tubes are parallel to each other and each tube comprises a first end and a second end, and wherein each tube has an interior volume adapted to store a pressurized gas therein,
one or more collectors configured to be connected to the first end and the second end of the tubes in a manifold plug configuration, sealing the interior volume of all the tubes and forming an assembly, and
one or more belts adapted to wrap around the assembly formed by the tubes connected to the collectors, and to support a load that the pressurized gas within the interior volume of the tubes exerts on the collectors,
wherein:
at least one collector has a port that serves as a gas inlet and outlet to the system,
the one or more collectors have an internal conduit that allows fluidic connection between all the tubes of the system, with at least one channel connected to the port,
one or more covers adapted to cover an area or areas of the assembly that are not enclosed by the one or more belts,
a rigid foam occupies an exterior volume of the tubes that is delimited by the belt, the collectors, and the one or more covers,
each of the one or more collectors has an accommodation adapted to receive the corresponding first end or second end of each tube,
between the corresponding ends of the tubes and the accommodation there is a bonding surface comprising a welding material, an adhesive, and/or a mechanical adjustment,
the one or more covers have folded flanges that overlap the one or more belts, providing for a welded, adhesive, and/or mechanical connection between the one or more covers and the one or more belts,
the one or more covers also have flanges overlapping with at least a portion of a lateral surface of the one or more collectors, allowing for a welded joint, adhesive, and/or mechanical connection between the one or more covers and the one or more collectors, and in which
a coating liner on an inner surface of the tubes decreases the permeability of the stored pressurized gas through the inner surface of the tubes.

2. The system according to claim 1, wherein:
the internal conduit of the one or more collectors comprises a main channel connected to the interior volume of each tube in the plurality of tubes and wherein the main channel branches into secondary channels, each of the secondary channels being connected to the interior volume of a corresponding tube through one or more holes, thereby establishing a fluidic connection between the main channel and the plurality of tubes, and wherein the main channel is connected to the port through a hole, enabling the entry and egress of gases into and out of the system.

3. The system according to claim 2, wherein:
the port has an anchoring element located inside the body of the collector which allows to improve the welded joint, adhesive and/or mechanical bonding between both components, and in which,
the collectors are made using short fiber composites and thermoplastic polymeric matrix of the same material type as the tubes facilitating the welded joint between both components.

4. The system according to claim 1, wherein:
the tubes are made of continuous unidirectional fiber composite material with a direction of one or more reinforcement fibers oriented in a circumferential direction of the cross section of the tube,
this fiber being intended to bear a circumferential stress exerted by the gas on the tube, and in which
the belts are made of continuous unidirectional fiber composite material, with the reinforcing fibers of the belts being oriented mostly in parallel to the direction of a loop described by the belt as it is wrapped to the assembly formed by the matrix of tubes and the collectors, being the reinforcement fibers of the belts intended to bear one or more axial stresses that the gas exerts on the collectors and are transmitted to the belts.

5. The system according to claim 1, wherein:
the collectors have a curved surface that allows the belts to be wrapped smoothly avoiding uneven curves in the changes of direction of the belts when it is wound around the assembly formed by the tubes and the collectors, and in which
a surface in the area of contact between the belt and the collectors allows to carry out a welded joint, adhesive and/or mechanical bonding between both components.

6. The system according to claim 1, wherein:
the accommodation in the one or more collectors comprises a groove adapted to match a geometric shape of the cross-section of the corresponding tube and a depth that allows a portion of the corresponding tube to be inserted therein to ensure the structural and hermetic connection between the one or more collectors and the corresponding tube,
wherein between the ends of the tubes and the accommodation there is a bonding surface comprising an entire area of contact between the one or more collectors and the corresponding tube, characterized by a thickness of welding material, adhesive, and/or mechanical adjustment, and in which a seam of welded or adhesive bonding material is applied between the corresponding tube and the collector at an outer surface of the tube and an outer edge of the accommodation at the surface of the collector exposed to the tubes.

7. The system according to claim 6, wherein:
the accommodation is formed by a set of groove patterns which allows inserting a group of tubes which are in contact with each other.

8. The system according to claim 1, wherein:
the matrix arrangement of tubes is arranged in a space where a geometric center of the cross section of the tubes are located in one or more nodes of a planar square lattice, or
in the nodes of a planar triangular lattice, for maximizing a packing factor of the tubes' arrangement.

9. The system according to claim 1, wherein:
the tubes are in contact with each other, or, between the tubes there is a certain gap, and in which the tubes in contact have some type of welded joint and/or adhesive bonding in the contact area.

10. The system according to claim 1, wherein:
the tubes have a circular geometry in their cross section, or, the tubes present a hexagonal geometry in the polygonal cross section with rounded corners where the sides of the tubes are in contact with each other forming a planar triangular lattice.

11. The system according to claim 1, wherein:
an array of tubes is made up of tubes of equal length, or the array of tubes is comprised of several subgroups of tubes, each subgroup being characterized by a length of tube equal within the subgroup and different for each subgroup, the subgroups being distributed in several portions along a shared collector which contains the internal conduit that allows fluidic connection between all the tubes of the system and having a different belt and a different collector for each subgroup of tubes opposite to the collector shared by each subgroup of tubes.

12. The system according to claim 1, wherein:
an array of tubes is arranged in the form of a matrix with a certain number of rows and columns, or, the array of tubes is comprised by several subgroups of tubes, each subgroup of tubes being characterized by a matrix spatial arrangement with a number of different rows and columns for each subgroup, a different belt being used for each subgroup, and the collectors being shared for all the subgroups.

13. The system according to claim 1, wherein:
there is at least one middle collector in-between two or more sets of tubes, in which there is an internal conduit that allows fluidic connection between all the tubes of the system and contains the port for filling and emptying gas to the system.

* * * * *